United States Patent [19]
Siegenthaler

[11] Patent Number: 5,290,376
[45] Date of Patent: Mar. 1, 1994

[54] PROCESS FOR MANUFACTURING AN OUTER TREAD ASSEMBLY

[75] Inventor: Karl J. Siegenthaler, Rome, Italy

[73] Assignee: Bridgestone Corporation, Tokyo, Japan

[21] Appl. No.: 966,986

[22] Filed: Oct. 27, 1992

[30] Foreign Application Priority Data

Oct. 31, 1991 [IT] Italy .................. TO91 A000821

[51] Int. Cl.⁵ ............................................ B29D 30/52
[52] U.S. Cl. .................................. 156/129; 156/117; 156/130; 156/130.3; 264/326
[58] Field of Search ................. 156/110.1, 111, 117, 156/123, 126, 127, 128.1, 128.6, 129, 130, 130.3, 130.5, 294, 394.1, 396, 397, 405.1, 406.2, 406.6, 408, 421.6, 421.8; 29/450, 451, 453; 425/36, 46, 28.1, 35, 47, 56, 58; 264/501, 502, 326

[56] References Cited

U.S. PATENT DOCUMENTS

| | | | |
|---|---|---|---|
| 2,915,108 | 12/1989 | Antraigue | 156/408 |
| 2,952,900 | 9/1960 | Glavan | 29/453 |
| 3,308,000 | 3/1967 | Holman | 156/130 X |
| 4,738,738 | 4/1988 | Holroyd et al. | 264/326 X |

FOREIGN PATENT DOCUMENTS 28499  9/1970  Japan ..................... 156/130.3

*Primary Examiner*—Geoffrey L. Knable
*Attorney, Agent, or Firm*—David A. Thomas

[57] ABSTRACT

A process for manufacturing a second stage tread assembly (1) of a road vehicle tire, whereby a green annular tread cap (2) is fed onto and stitched internally against, the inner annular surface (23) of an annular forming body (18) negatively reproducing the final outer annular surface (3) of the tread cap (2). A number of further annular components (7,14), comprising a reinforced annular tread belt (14), are successively fed into the annular body (18) and onto a barrel-shaped inner annular surface (5) of the tread cap (2).

8 Claims, 4 Drawing Sheets

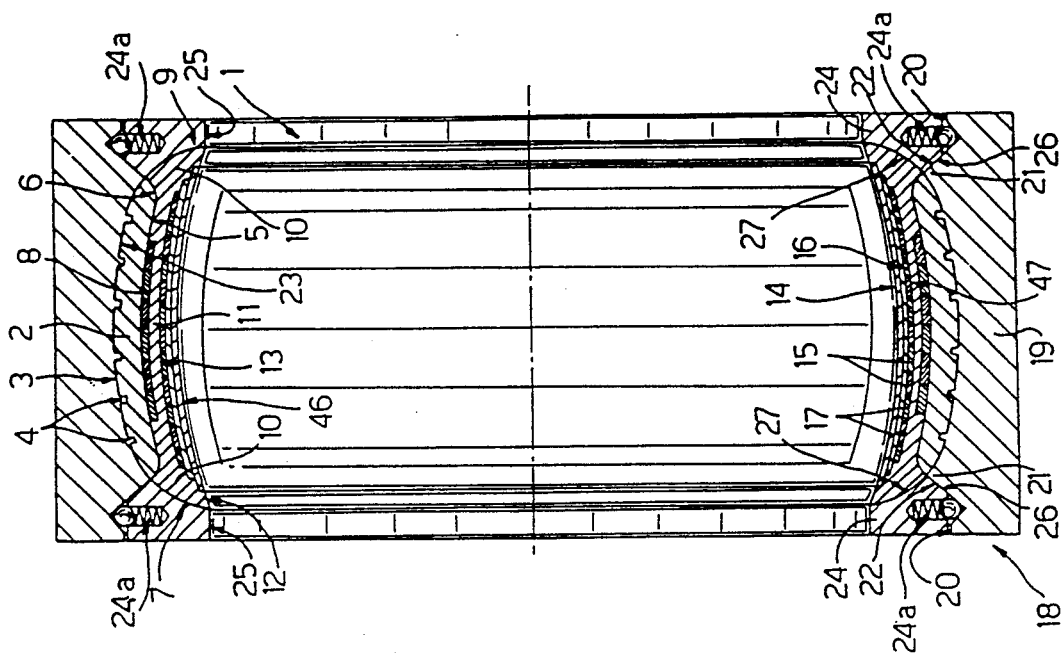

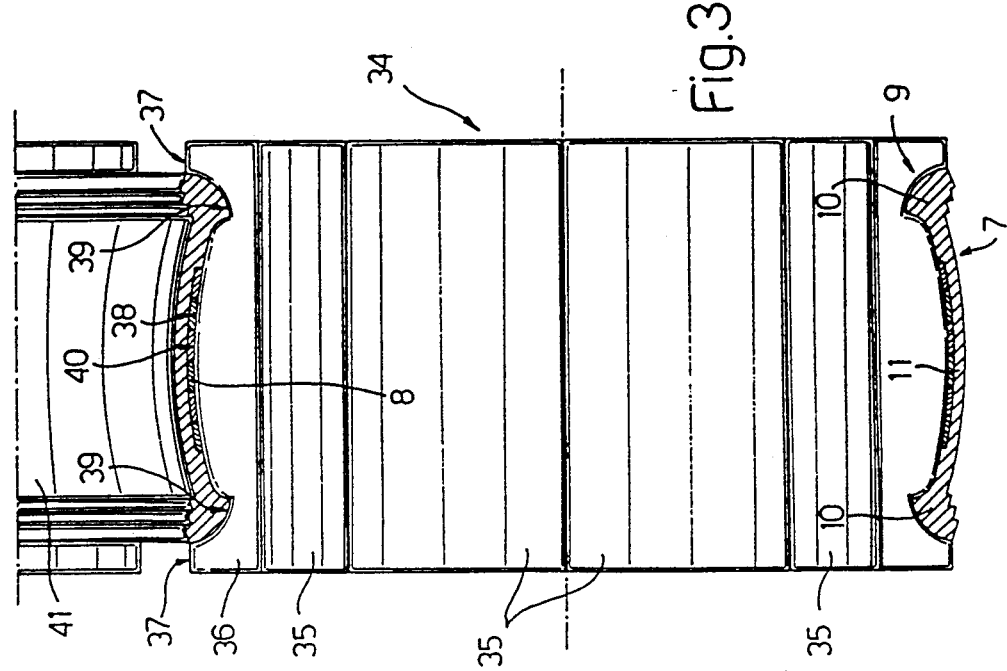
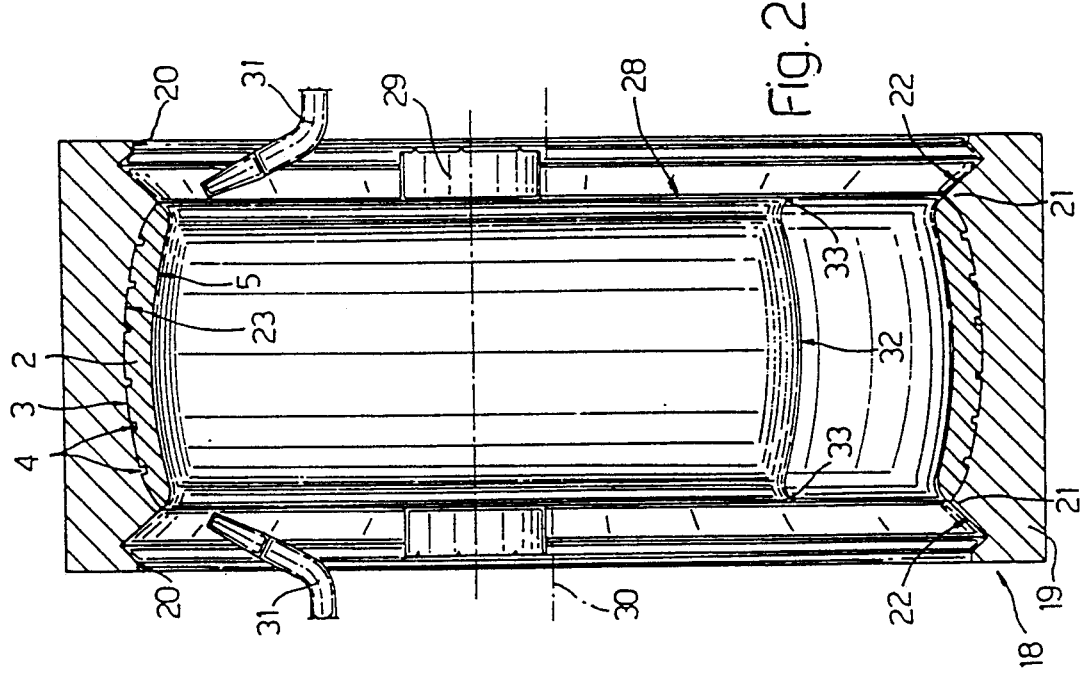

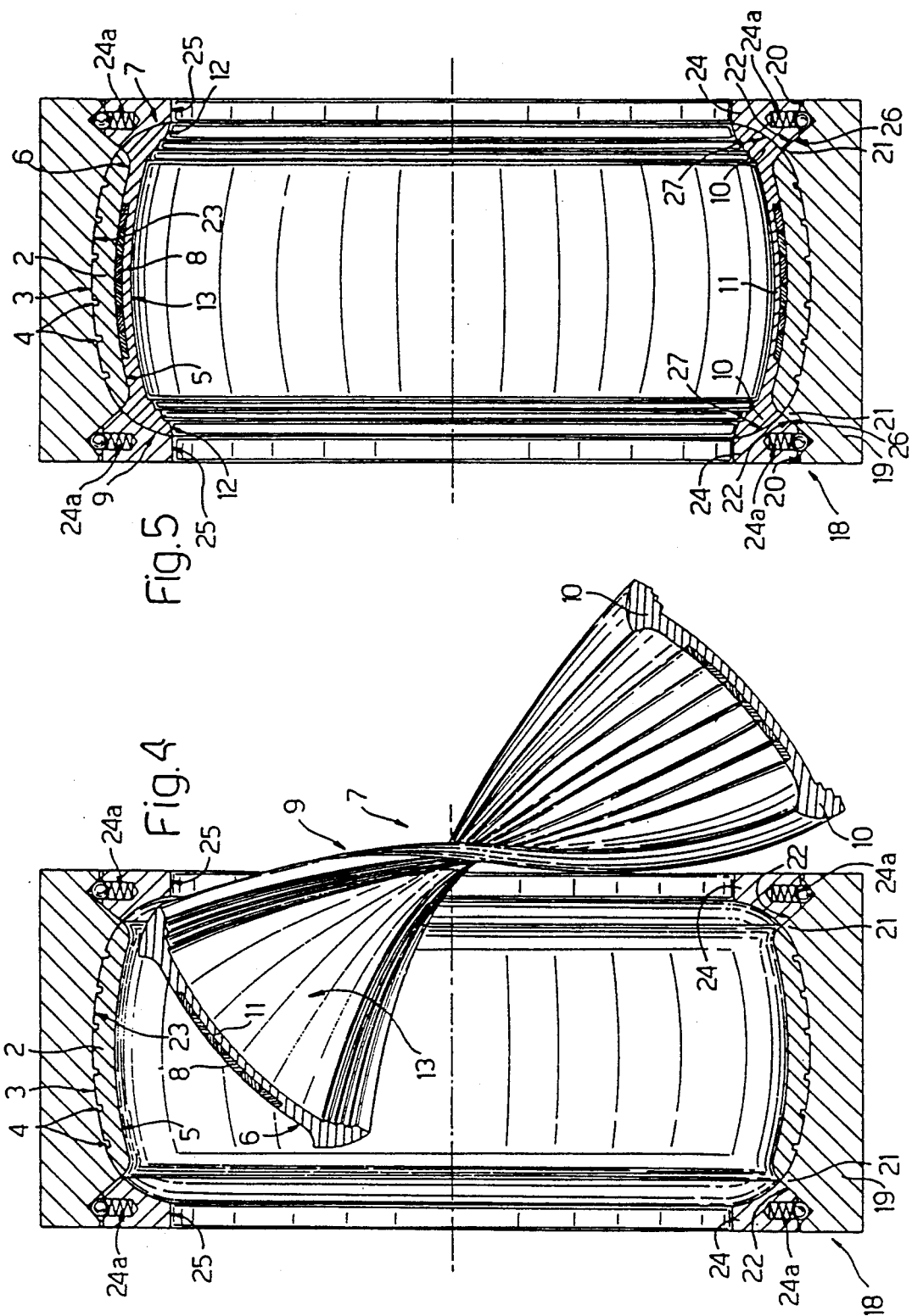

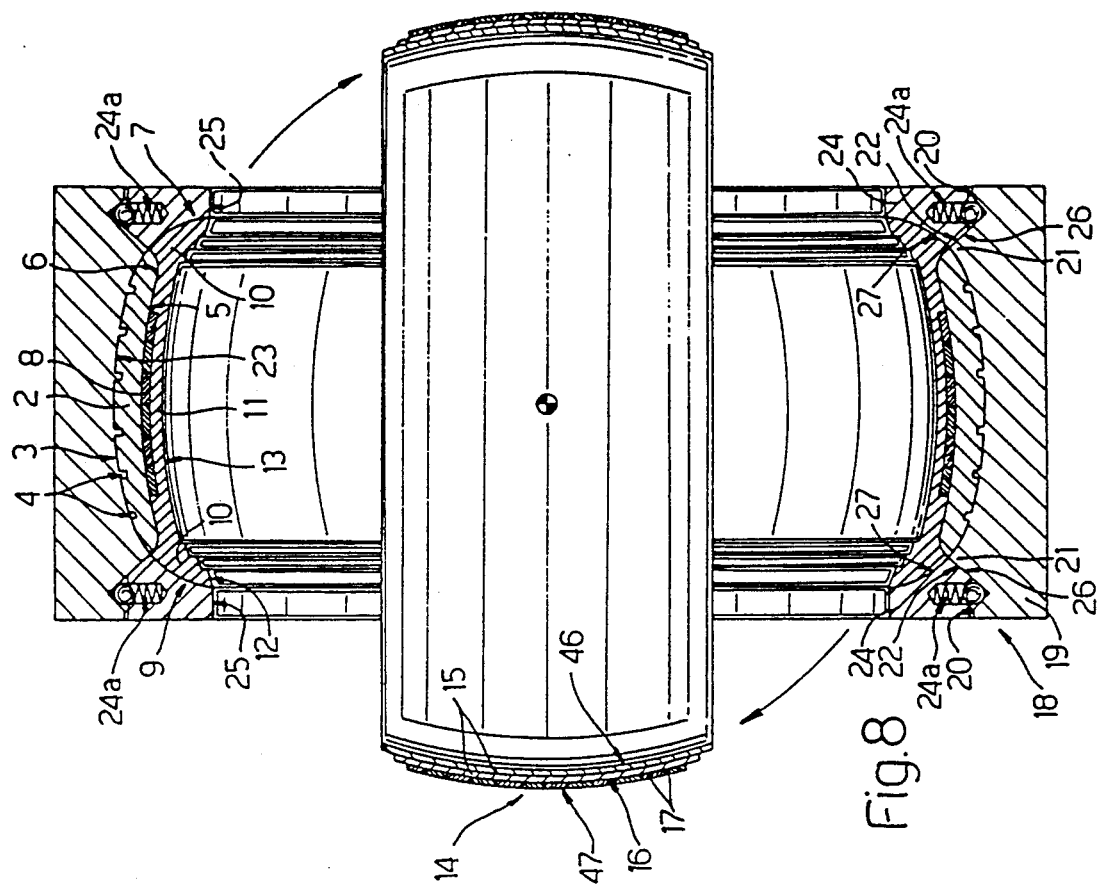

PROCESS FOR MANUFACTURING AN OUTER TREAD ASSEMBLY

BACKGROUND OF THE INVENTION

Technical Field

The present invention relates to a process for manufacturing a second stage tread assembly of a road vehicle tire.

SUMMARY OF THE INVENTION

It is an object of the present invention to provide a process enabling the component parts of the tread assembly to be formed, as near as possible, to the required finished shape, so as to minimize stress in the finished tire.

It is a further object of the present invention to provide a process enabling the material of the tread assembly components to be distributed as evenly as possible about the tread assembly axis.

Finally, it is a further object of the present invention to provide a process enabling finish shaping of the outer tread surface of the second stage tread assembly, with no tensile stress being applied to the internal components of the assembly.

According to the present invention, there is provided a process for manufacturing a second stage tread assembly of a road vehicle tire, comprising the steps of feeding a green annular tread cap on to a first annular surface consisting of the inner annular surface of an annular body, said first surface negatively reproducing a second surface consisting of the final outer annular surface of said tread cap; internally stitching said tread cap against said first surface, so as to form an outer surface of said tread cap similar to said second surface; and successively feeding into said annular body, and on to a third surface constituting the inner annular surface of said tread cap, a number of further annular components comprising a reinforced annular tread belt.

In the above process, said annular tread cap is preferably stitched internally by stitching means whereby said third surface is rendered substantially barrel-shaped, with its concave side facing inwards.

BRIEF DESCRIPTION OF THE DRAWINGS

A number of non-limiting embodiments of the present invention will be described by way of example with reference to the accompanying drawings, in which:

FIG. 1 shows a cross section of a second stage tread assembly formed inside an annular body according to the teachings of the present invention;

FIGS. 2 to 8 show successive stages in the formation of the FIG. 1 tread assembly.

BEST MODE FOR CARRYING OUT THE INVENTION

Number 1 in FIG. 1 indicates a second stage tread assembly comprising an annular tread cap 2, the outwardly-convex, substantially barrel-shaped outer surface 3 of which presents a number of grooves 4 defining the tread pattern, and the inwardly-concave, substantially barrel-shaped inner surface 5 of which is coaxial with surface 3.

Cap 2 is housed inside an annular groove 6 formed along the outer surface of an annular base-cushion assembly 7 comprising a base 8 on surface 5. A cushion 9 is located inside base 8 and has two lateral annular ribs 10 located on opposite sides of groove 6 and is connected by an intermediate, transversely-curved annular strip 11, the outer surface of which presents an annular groove housing base 8.

Cushion 9 is defined internally by an inwardly-concave, substantially barrel-shaped surface 12 having an annular groove 13 housing a tread belt 14 defined by a given number of superimposed annular tread plies 15, and by a helper ply 16 consisting of a strip 17 of elastomeric material wound about plies 15.

Assembly 1 is formed inside an annular forming body 18 comprising (FIG. 1) a cylindrical ring 19 having a substantially rectangular axial half section, and defined internally by a cylindrical surface 20 having a central annular rib 21, the opposite axial ends of which define two annular axial shoulders 22. Rib 21 is defined internally by an annular surface 23 having a substantially barrel-shaped axial half-section mating with surface 3 of tread cap 2, designed to negatively reproduce the central portion of surface 3.

Each end of ring 19 is fitted inside with a lateral ring 24 which is connected to ring 19 by a ring of spherical clamping devices 24a. Each lateral ring 24 is defined by an outer cylindric surface, the diameter of which is approximately equal to but no larger than that of surface 20, and internally by a cylindrical surface 25 coaxial with surface 20; and laterally by an annular end surface 26 comprising a flat outer annular portion contacting and facing a respective annular shoulder 22. Ring 24 further has a substantially truncated-cone-shaped inner annular portion 27 tapering outwards and blending at its wider end with a respective axial end of surface 23.

The method whereby assembly 1 is formed inside annular forming body 18 will be described with reference to FIGS. 2 to 8.

Firstly, as shown in FIG. 2, tread cap 2 is fed onto curved inner surface 23 inside ring 19. This may be done in substantially two ways. One way is to hot extrude tread cap 2 directly onto surface 23 using a known extrusion head (not shown), which is moved along surface 23 to produce an annular element (not shown) corresponding to a semi-finished tread cap 2. The other way consists in feeding a tread ply (not shown) onto surface 23, and splicing the ends to produce said annular element (not shown).

In either case, the annular element so formed is "calendered", to expand it radially against surface 23, by a roller 28 fitted on to a drive shaft 29 eccentrically parallel to axis 30 of annular body 18. Roller 28 is mounted eccentrically inside ring 19 and rolled therealong by shaft 29 so as to exert outward radial pressure on the annular element (not shown), which thus merges with surface 23 to form tread cap 2 inside ring 19. The surface 3 of cap 2 exactly reproduces, at the green stage, the outer tread pattern of the finished tire (not shown).

Experience has shown that the above calendering operation is only relatively easy to perform when conducted hot, and when the diameter of roller 28 is at least 70% that of surface 23. Consequently, whereas calendering is naturally performed hot in the case of a tread cap 2 extruded directly inside ring 19, external heating elements, such as hot air injectors 31 in FIG. 2., are required when producing cap 2 from said preformed tread ply (not shown).

Roller 28 presents an outwardly-convex, substantially barrel-shaped outer surface 32, the axial half section being shaped as to mate with the axial half section of surface 5. Surface 32 is defied axially by two annular ribs, the outer end of each of which is defined by an annular cutting edge 33, which, during the calendering operation, is rolled against a respective axial end edge of surface 23. Any excess elastomeric material expelled by the calendering operation from the chamber defined between surfaces 23 and 32 in the instantaneous contact zone between roller 28 and ring 19, is thus automatically removed by the mobile cutter defined by edges 33 and ring 19, to produce a tread cap 2 of exactly the required weight and section.

As shown in FIG. 3, in the time taken to form tread cap 2 inside annular body 18, a base-cushion assembly 7 is formed on a drum 34 defined in a known manner by a number of sectors 35 collapsible as of the expanded position shown in FIG. 3. In the FIG. 3 position, sectors 35 define a cylindrical outer ring 36, the outer surface 37 of which presents an annular recess 38 defined at its axial ends by two annular grooves 39 located on either side of an outwardly-convex, substantially barrel-shaped surface 40.

In actual use, a first layer of elastomeric material is fed onto surface 40, so as to define base 8, after which, a second layer of elastomeric material is fed onto base 8 to fill annular recess 38. The second layer is then calendered on ring 36 by a pressure roller 41 tangent to ring 36, the surface of which defines, together with surface 40 and grooves 39, the two ribs 10 and annular strip 11.

At this point, sections 35 are collapsed to unload base 8 and cushion 9 off of drum 34. It should be pointed out that, at this stage, base 8 and cushion 9 constituting assembly 7, are upside down i.e. with base 8 inside instead of outside cushion 9. Consequently, as shown in FIG. 4, base 8 and cushion 9 must be turned over before inserting assembly 7 inside tread cap 2, as shown in FIG. 5.

The formation of assembly 7 on drum 34 with base 8 and cushion 9 upside down provides for simplifying the process, in that it is decidedly easier to lay the thicker cushion 9 on the thinner base 8 than vice versa. Technically, of course, there is nothing to prevent assembly 7 from being produced in its final form at the outset, or base 8 and cushion 9 from being produced separately and connected respectively to the outer surface of tread belt 14 and to the inner surface of tread cap 2, so as to produce assembly 7 when belt 14 is fitted inside tread cap 2.

As shown in FIG. 6, belt 14 is formed on a further drum 42 defined in known manner by a number of sectors 43 collapsible as of the expanded position shown in FIG. 6. In the FIG. 6 position, sectors 43 define a cylindrical outer ring 44, the outwardly-convex, substantially barrel-shaped outer surface 45 of which provides, at the outset, for conferring on belt 14 the final shape of a substantially spherical annular crown. This crown is defined internally and externally by two barrel-shaped surface 46 and 47, the first of which mates with surface 45.

Once belt 14 has been formed in a known manner on drum 42, sectors 43 are collapsed for unloading belt 14, which is relatively rigid and easy to handle. As shown in FIGS. 7 and 8, belt 14 is assembled inside annular body 18 using a technique similar to that employed for assembling ball bearings, whereby belt 14 (FIG. 7) is first arranged facing annular body 18, with its axis perpendicular to the axis of, and in a first diametrical plane of, annular body 18. Belt 14 is then compressed diametrically in direction 48 perpendicular to said first diametrical plane, then is moved along a second diametrical plane of body 18 perpendicular to said first diametrical plane, and then through body 18 so as to position it symmetrically in relation to body 18 (FIG. 8). The diametrical pressure on belt 14 is then released to allow it to expand against inner surface 12 of cushion 9. Belt 14 then is rotated 90° in relation to body 18 about an axis perpendicular to the axis of body 18 and to the said first diametrical plane, so as to click inside groove 13.

The process according to the present invention therefore provides, at the outset, for achieving not only the final shape but also the final dimension of each of the component parts of tread assembly 1. This prevents, at the forming stage, the formation of internal stress largely responsible for the lack of uniformity and poor quality of the finished tire.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A process for manufacturing a second stage tread assembly of a road vehicle tire, comprising the steps of feeding a green annular tread cap onto a first annular surface consisting of an inner annular surface of an annular body, said first annular surface negatively reproducing a second surface consisting of a final outer annular surface of said tread cap; internally stitching said tread cap against said first annular surface by passing a stitching roller over a third surface substantially coaxial with said first and second surfaces, so as to form an outer surface of said tread cap similar to said second surface and simultaneously cutting the tread cap to width; and successively inserting into said annular body, and onto the third surface constituting an inner annular surface of said tread cap, a number of further annular components comprising a reinforced annular tread belt.

2. A process as claimed in claim 1 in which said annular tread cap is hot extruded directly into said annular body.

3. A process as claimed in claim 1 in which said annular tread cap is produced by splicing two opposite ends of a tread ply to form an annular tread ply; heating the annular tread ply; and expanding the heated annular tread ply, by means of said internal stitching, against said first surface.

4. A process as claimed in claim 1 in which said internal stitching of said annular tread cap is performed by stitching means designed to render said third surface, which includes a middle portion and two edges, inwardly-convex such that said edges have smaller diameters than said middle portion.

5. A process as claimed in claim 1 in which the step of inserting further annular components into said annular body further comprise the step of inserting an annular base-cushion assembly into said annular body, which annular base-cushion assembly has a base which contacts said third surface and a cushion inside said base; forming said base-cushion assembly before inserting said base-cushion assembly into said annular body on a first expandable auxiliary drum with said base contacting an outer surface of said first drum; and turning over the base-cushion assembly so that said base is on the outside of the base-cushion assembly before inserting said base-cushion assembly inside said annular body and on to said third surface.

6. A process as claimed in claim 5 including the further step of forming said tread belt by placing at least two superimposed plies about a second expandable auxiliary drum and on a substantially convex outer surface of said second drum substantially mating with said third surface.

7. A process as claimed in claim 6 including the further step of forming said tread belt by winding a strip of elastomeric material about said plies.

8. A process as claimed in claim 6 including the steps of inserting said tread belt inside said annular body by positioning the tread belt facing the annular body, with its axis perpendicular to the axis of, and in a first diametrical plane of, the annular body; radially compressing the tread belt in a direction perpendicular to said first diametrical plane; moving the tread belt along a second diametrical plane of the annular body perpendicular to said first diametrical plane, and through the annular body so as to position the tread belt symmetrically in relation to the annular body; radially releasing he tread belt; and rotating the tread belt in relation to the annular body and about an axis perpendicular to the axis of the annular body and to said first diametrical plane.

* * * * *